Sept. 20, 1927.
J. A. BARRETT
AUTO WHEEL SLEIGH RUNNER
Filed Feb. 28, 1927
1,642,714
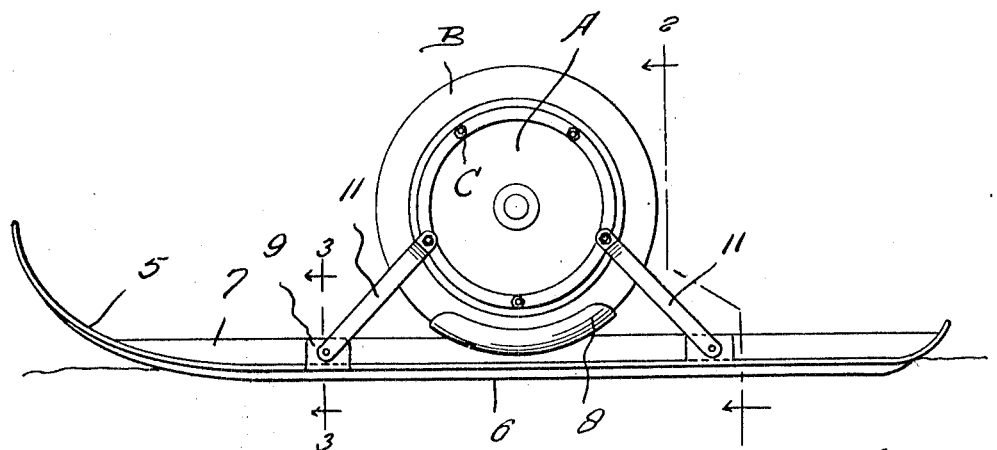
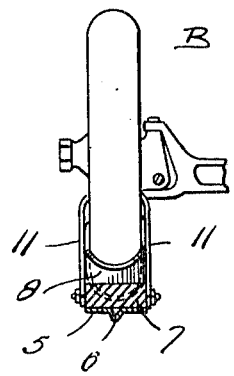
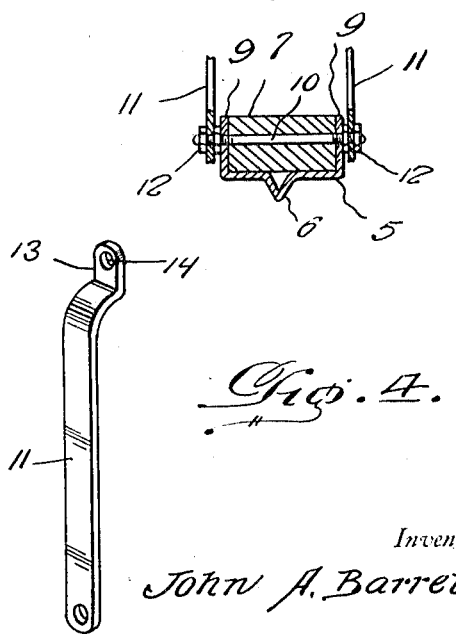
Inventor
John A. Barrett,
By Clarence A. O'Brien
Attorney Patented Sept. 20, 1927.

1,642,714

UNITED STATES PATENT OFFICE.

JOHN ALTON BARRETT, OF McMILLAN, MICHIGAN.

AUTO WHEEL SLEIGH RUNNER.

Application filed February 28, 1927. Serial No. 171,664.

This invention relates to new and useful improvements in sleigh runners, particularly constructed for attachment to the front wheels of an automobile, and has for its primary object to provide a runner of this character that is so constructed as to enable the same to be disposed beneath the front wheel of an automobile and rigidly secured thereto without requiring the removal of the usual pneumatic tire therefrom.

A further and most important object of this invention is to provide a sleigh runner that has means for facilitating the positive attachment of the same to a conventional automobile front wheel by reason of the usual rim lug bolts of said wheel.

A further salient object is to provide a new and improved sleigh runner that is of unusually simple construction and so designed as to permit the ready attachment or detachment of the same with respect to an automobile wheel.

In the drawing wherein like reference characters indicate corresponding parts throughout all of the views:

Figure 1 is a side elevation of my improved sleigh runner as actually associated with an automobile wheel.

Figure 2 is a section taken substantially upon the line 2—2 of Figure 1 back of the automobile wheel for more clearly disclosing the sleigh runner construction.

Figure 3 is a somewhat similar section taken substantially upon the line 3—3 of the same figure, and Figure 4 is an enlarged perspective of one of the tie straps for facilitating the rigid connection of the runner to the wheel.

Now having particular reference to the drawing, A designates a conventional design of automobile front wheel upon the periphery of which is the usual pneumatic tire B carried by the usual rim secured thereon by rim lugs or a retaining ring arranged over the outer ends of spaced bolts C. The device per se consists of a relatively elongated steel or other suitable metal runner 5 curved upwardly at its forward end to a considerable degree and slightly curved upwardly at its rear end as in Figure 1.

Throughout the length of the runner the center thereof is longitudinally fluted to provide a rib 6 to prevent skidding of the runner. Arranged upon the inner face of the runner 5 is a filler 7 of wood or other suitable material equipped intermediate its ends with a curved pan 8 within which the tire B of the automobile wheel A rests, as disclosed in both Figures 1 and 2.

The opposite edges of the runner 5 at both ends of the tire receiving pan 8 are formed with upstanding ears 9. Extended through registering openings in each pair of ears as in Figure 3 is an elongated bolt 10 upon the outer ends of which are loosely arranged tie straps 11—11 preferably of metal, the same being secured to the respective bolts by nuts 12—12. The inner end of each tie strap 11 is slightly curved inwardly, while the extreme inner end thereof is formed with a lug 13 having an opening 14, which lug will engage the wheel A, while an adjacent one of the rim lug or rim bolts may be disposed through the opening after which the usual nut may be threaded thereon for securing the tie strap to said wheel and consequently the runner.

It will thus be seen that I have provided a highly novel, simple, and efficient sleigh runner that is well adapted for attachment to the front wheels of automobiles, and even though I have herein shown and described the invention as consisting of certain detail structural elements it is nevertheless to be understood that some changes may be made therein without affecting the spirit and scope of the appended claims.

Having thus described the invention, what I claim is:—

1. In a sleigh runner for automobile wheels, a metallic runner, a filler strip disposed upon the inner face of the runner, means arranged intermediate the ends of the filler strip for receiving and supporting a vehicle wheel, means whereby the wheel may be rigidly secured to the runner at opposite sides of the filler strip and at opposite ends of said wheel supporting means, said means consisting of a plurality of metallic straps pivoted at certain ends to the runner, and lugs formed upon the inner ends of the straps having openings therein for engagement over adjacent wheel rim lug bolts.

2. In a vehicle wheel sleigh runner of the character described, a metallic runner, a filler strip arranged upon the inner face of the runner and upon which the automobile wheel is to be disposed, pairs of upstanding ears formed upon opposite edges of the runner and at opposite sides of the center thereof, cross bolts arranged through the ears, and through the filler strip, straps arranged at certain ends upon the ends of the bolts, and means at the opposite ends of said straps to facilitate the attachment of the same to the vehicle wheel.

In testimony whereof I affix my signature.

JOHN ALTON BARRETT.